3,387,055
PROCESS FOR QUENCHING IODINE-EFFECTED DEHYDROGENATION EFFLUENT
Lynn D. Harber, Moore, Okla. (% El Paso Products Co., P.O. Box 3896, Odessa, Tex. 79760)
Filed Sept. 29, 1966, Ser. No. 600,676
11 Claims. (Cl. 260—681.5)

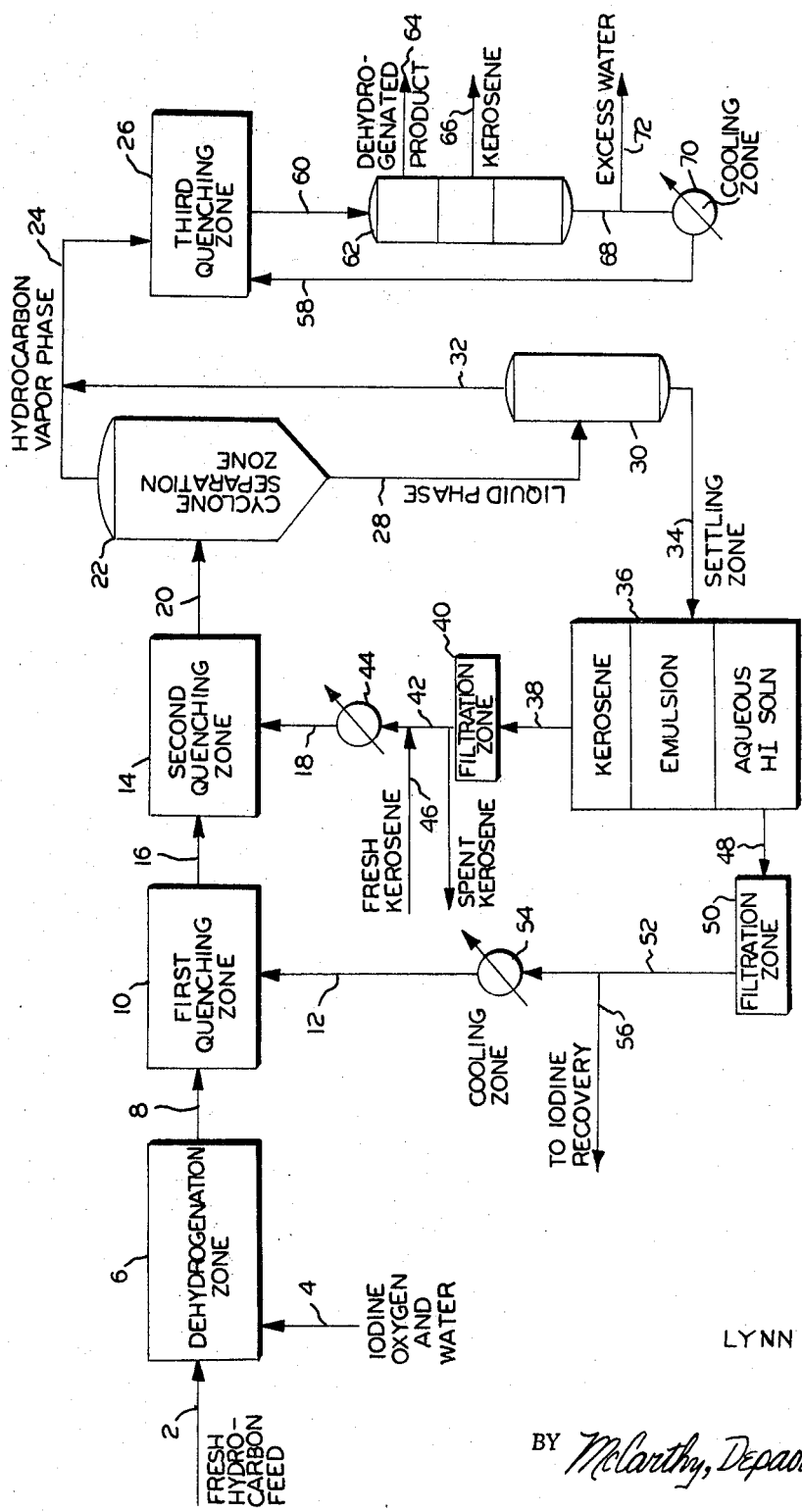

ABSTRACT OF THE DISCLOSURE

The effluent, e.g., butadiene, from dehydrogenation with added iodine, is progressively reduced in temperature and purified by successive contact with aqueous HI and with kerosense, followed by separators and settling zones.

---

The present invention relates to an improved process for the dehydrogenation of hydrocarbons. More particularly, this invention relates to an improved process for quenching the dehydrogenated effluent obtained from an iodine-effected dehydrogenation zone.

The demand for commercial quantities of unsaturated hydrocarbons, particularly light olefins and diolefins, is ever increasing. Olefins such as styrene and diolefins such as butadiene and isoprene have become significantly valuable materials due to the importance thereof as ingredients in the manuafcture of synthetic rubbers, plastics and foams. Thus, it is apparent that a definite need exists for a commercially attractive process which is capable of providing specifically desired unsaturated hydrocarbons.

One dehydrogenation process which has been used frequently heretofore, comprises contacting the saturated hydrocarbon starting material with iodine, at an elevated temperature and preferably in the presence of oxygen, to effect the dehydrogenation of the hydrocarbon feed material. Unfortunately, one of the disadvantages of the above process, which has hindered its commercial success, is that the iodine and hydrogen iodide present in the dehydrogenation zone promote polymerization of the hydrocarbons. Polymerization, which occurs primarily among the dehydrogenated hydrocarbons, causes the undesired formation of tars and polymers. The tar and polymer formation reduces the yield of the desired dehydrogenated hydrocarbon product. In addition, the tars and polymers deposit out on the walls of the lines and the vessels downstream of the dehydrogenation zone thereby causing operating problems which frequently necessitate closing down the overall system in order to remove the deposits.

Polymerization, which occurs to some extent during the dehydrogenation reaction, is most pronounced during the time the dehydrogenated effluent is withdrawn from the dehydrogenation zone and introduced into a quenching zone to remove the iodine and hydrogen iodide from contact with the hydrocarbons.

Heretofore, a number of schemes have been used to attempt to minimize polymerization of the hydrocarbons. One scheme comprised removing the active iodine species from contact with the dehydrogenated hydrocarbon product as soon as possible after the dehydrogenation reaction, for example, removing the iodine and hydrogen iodide from the hydrocarbons within 0.01 second of withdrawing the effluent from the dehydrogenation zone.

A further scheme was to immediately substantially cool the dehydrogenated effluent from its plus 300° C. reaction temperature. A still further scheme was to dilute the dehydrogenated effluent with inert diluents in hopes of reducing the rate of reaction between the active iodine species and the dehydrogenated hydrocarbons by reducing the rate at which collisions of the respective molecules occur in the mixture.

Unfortunately, none of the above schemes, either alone or in combination, have been economically successful in preventing or minimizing the deleterious polymerization reactions. Similarly, none of the schemes used heretofore have been economically successful in preventing or minimizing deposition of the tars and polymers on the walls of the lines and vessels downstream of the dehydrogenation zone.

Accordingly, the primary object of the present invention is to provide an improved process for overcoming the aforesaid disadvantages.

A further object of the present invention is to provide an improved iodine-effected dehydrogenation process whereby polymerization of the dehydrogenated product is minimized.

A still further object of the present invention is to provide an improved iodine-effected dehydrogenated process, which is more economical than the processes used heretofore.

Another object of the present invention is to improve the operability of the iodine-effected dehydrogenation process by substantially preventing deposition of the tars and polymers.

Yet another object of the present invention is to provide a novel and an improved method for quenching the effluent obtained from the dehydrogenation zone.

In accordance with the present invention and the above defined objects, a hydrocarbon is contacted with iodine in a dehydrogenation zone maintained under dehydrogenation conditions such that a dehydrogenated effluent is obtained. The dehydrogenated effluent is passed into a first quenching zone wherein the effluent is contacted with an aqueous solution of hydrogen iodide. The above mixture of aqueous hydrogen iodide and dehydrogenated effluent is then contacted in a second quenching zone with kerosene, during a residence time of from 0.01 to about 10 seconds and preferably less than about 0.2 second. The second quenching zone effluent is then introduced into a separation zone to separately recover a dehydrogenated hydrocarbon phase, which is thereafter purified to yield the desired dehydrogenated hydrocarbon product.

In a preferred embodiment, the present invention contemplates further quenching the dehydrogenated hydrocarbon phase with water in a third quenching zone in order to remove any water and kerosene that might be entrained therein. The kerosene is recovered and recycled to the second quenching zone.

It was surprisingly found that the adidtion of the kerosene to the dehydrogenated effluent within 1.0 second of the water quench substantially improves the operability of the overall system. For example, substantially no deposits of tars or polymers are found on the walls of the lines and the vessels downstream of the dehydrogenation zone, as heretofore was the case. Instead, the tars and polymers that are formed flow freely with the hydrocarbon-quench mixture. Moreover, the addition of the kerosense substantially impedes the formation of additional tars and polymers.

The tars and polymers that do form are easily separated from the hydrocarbons and quenching fluids as hereinafter discussed with reference to the preferred embodiment of the present invention.

The term "kerosene" as hereinafter used, means a hydrocarbon having an average composition of 84 weight percent carbon and 16 weight percent hydrogen, and a sulfur content of no more than 0.125 weight percent. The kerosene distillation end point should be about 330° C. maximum and a flash point of about 46° C. minimum.

The process of the present invention is most advantageously and economically applicable to those hydrocarbons and feeds which upon dehydrogenation will provide a product which remains in the vapor phase after the kerosene quench operation has occurred. If the dehydrogenation product condenses, it will dissolve, usually in the kerosene phase, whereupon, the desired product would have to be recovered therefrom by distillation or other suitable means; such purification procedures while technically feasible only add to the heat load necessary to recover the desired product by distillation and the overall costs of the purification procedures. Therefore, the process of the present invention is preferably applicable to the dehydrogenation of the hydrocarbons which will not be condensed from the gas phase leaving the kerosene quenching zone at the temperatures at which the material leaves the quenching zone. In this regard, the process of the present invention is preferably operable to hydrocarbon feed stock having up to 8 carbon atoms. Hydrocarbon feeds which can be converted by iodine dehydrogenation to the desired dehydrogenation product which are applicable to the procedures of the present invention include the alicyclic hydrocarbons which are paraffinic in nature and alicyclic olefins which contain at least 4 carbon atoms in the skeletal chain; alicyclic which are paraffinic in nature and alicyclic hydrocarbon monoolefins having 5 or more carbon atoms in a ring structure. If desired, cyclic monoolefins may contain alkyl substitution in the ring structure.

Suitable iodine-effected hydrocarbon feeds which may be employed with facility in carrying out the process of this invention include n-butane; isobutane; 2-methylbutane; butene-2; butene-1; n-pentane; pentene-1; pentene-2; pentene-3; cyclopentane; 2,2 - dimethylbutane; 2,3 - dimethylbutane; 2-methylpentane; 3-methylpentane; n-hexane; hexene-1; hexene-2; methylcyclopentane; 2,2 - dimethylpentane; cyclohexane; 1,1-dimethylcyclopentane; 2,3-dimethylpentane; 2-methylhexane; 1,3-dimethylcyclopentane; 3 - methylhexane; 1,2 - dimethylcyclopentane; 3-ethylpentane; methylcyclohexane; ethylcyclopentane; 1,1,3-trimethylcyclopentane; 2,2-dimethylhexane; 2,5-dimethylhexane; 1,2,4-trimethylcyclopentane; 2,4-dimethylhexane; 2,2,3 - trimethylpentane; 1,2,3 - trimethylcyclopentane; 3,3-dimethylhexane; 2,3,4-trimethylpentane; 1,1,2-trimethylcyclopentane; 2,3,3-trimethylpentane; 2,3-dimethylhexane; 2 - methyl+3 - ethylpentane; cycloheptane; 2-methylheptane; 4-methylheptane; 3,4-dimethylhexane; 3-methyl-3-ethylpentane; 3-ethylhexane; 3-methylheptane; 1,4-dimethylcyclohexane; 1,1-dimethylcyclohexane; 1,3-dimethylcyclohexane; 1-methyl-3-ethylcyclopentane; 1-methyl-2-ethylcyclopentane; 1-methyl-1-ethylcyclopentane; 1,1,3,4-tetramethylcyclopentane; 1,2-dimethylcyclohexane; 2,2,5 - trimethylhexane; n-octane; 1,2,3,4-tetramethylcyclopentane; n - propylcyclopentane; ethylcyclohexane, and the like.

A preferred group of hydrocarbons particularly amenable to use in the dehydrogenation zone of the preferred embodiment of this invention and which are, therefore, highly preferred, are hydrocarbons selected from the group consisting of n-butane, butene-1, butene-2, a mixture of n-butane and butenes, isopentane, isopentene, cyclohexane, n-hexane and ethylbenzene.

The iodine-effected hydrocarbon feeds employed in the practice of the present invention may be charged to dehydrogenation zone as pure compounds or as simple concentrates thereof. Alternatively, they can be charged to the dehydrogenation zone as a mixture of hydrocarbons such as, for example, a mixture of saturated hydrocarbons and monoolefinically unsaturated hydrocarbons containing the same or different numbers of carbon atoms in the skeletal chain.

For a better and more complete understanding of the present invention, its objects and advantages, reference should be had to the following description and to the accompanying drawing which is a schematic flow diagram of a preferred embodiment of the present invention.

As shown in the drawing, hydrocarbon and iodine are introduced via conduits 2 and 4, respectively, into any conventional type dehydrogenation zone 6. The iodine and hydrocarbon, which are preferably preheated and vaporized prior to being introduced into the zone 6, react therein to produce organic intermediate and product compounds having higher carbon-to-hydrogen ratios than the feed hydrocarbon. Hydrogen iodide is also formed therein by reaction of the iodine with hydrogen, which is removed from the hydrocarbons.

While it is not essential to the operation of the dehydrogenation reaction, it has been found that economically it is desirable to introduce oxygen via a conduit 4 into the dehydrogenation zone 6 along with the hydrocarbon and the iodine. In this manner, the amount of iodine feed may be reduced. The oxygen reacts with the hydrogen iodide as it is being formed to produce water and additional iodine, the latter being reused in the dehydrogenation process.

Moreover, while any conventional type dehydrogenation zone may be used in the process of this invention, it is preferred that the dehydrogenation zone contain a bed of palpable particulate solid material and that the hydrocarbon is contacted therein with iodine, oxygen and water under the following conditions.

Preferably, the mole ratio of iodine to hydrocarbon introduced into the zone 6 is in the range of from about 0.0001 to 1.0 with the provision that when the mole ratio of iodine to hydrocarbon is greater than 0.1, the mole ratio of oxygen to iodine is greater than about 2.0.

The mole ratio of water (introduced via the conduit 4) to the hydrocarbon is in the range of from 1.0 to 50.0.

Oxygen, introduced into the zone 6 via the conduit 4 may be pure oxygen or an oxygen-containing gas such as air.

Generally, the temperatures in the dehydrogenation zone 6 can be maintained in the range of from 450° C. to 800° C. at substantially atmospheric pressure with desirable results. Preferably, a temperature between about 480° C. and 700° C. has been found satisfactory. The use of higher temperatures is not objectionable as long as undesired reactions do not occur and the contact time is maintained such that coking is minimized and the like.

The dehydrogenation is suitably carried out at various pressures, from subatmospheric to superatmospheric pressures in the vapor phase. Although atmospheric pressures are suitable and advantageous in most cases, other considerations involving separation and recovery of the products from the dehydrogenation effluent make a superatmospheric pressure more desirable in some cases. Thus, the pressure can be at any value at which the desired hydrocarbon product is substantially thermally stable. The pressure employed is preferably in the range between 1 and 10 atmospheres absolute but may be higher in some cases, even as high as 30 to 40 atmospheres, if necessary.

The residence time of the reactants at the selected reaction conditions depends upon the particular hydrocarbon reactants, the proportions of iodine and oxygen, the temperature and pressure and the nature of the desired dehydrogenation product. In general, it should be at least about 0.01 second and can be as long as 60 seconds. With most common reactants in the vapor phase, the dehydrogenation is sufficiently rapid so that a residence time of from 0.1 to 7 seconds suffices and is preferred.

The water utilized in the dehydrogenation zone 6 can be introduced therein in a variety of ways, such as water vapor or steam. The water can be conveniently comingled with any of the feedstocks charged to the dehydrogenation zone or, if desired, the calculated amount of water can be added to one or more of the feed materials charged to the zone. Alternatively, the water can be introduced as a liquid along with the liquid hydrocarbon charged, if desired, or can be introduced with the iodine source as an aqueous solution of hydrogen iodide and/or iodine.

The solid material contemplated for utilization in the dehydrogenation zone is in palpable particulate form, in contradistinction to solid materials in finely divided form, and has a total surface area of less than about 0.5 square meter per gram. The individual particles of the solid material suitably may be in any physical shape, including, without limitation, in the shape of pellets, rock, rings, tablets, saddles, spheres, particles of irregular shaped granules formed by grinding and the like. Any material which is a solid and maintains its chemical and physical integrity at the reaction temperatures suitably may be employed in forming the bed of palpable particulate solid material utilized in the present process.

The palpable particulate solid material may be used in the form of a fixed packed bed or a moving compact bed. Such solid materials include those formed of suitable metals, refractory and ceramic materials, inorganic salts, and the like. Specific examples of suitable materials which may be used in forming the palpable particulate solid employed in the invention include, without limitation, Hastaloy C metal, quartz, glass, zirkite, corhart, mullite, silica sand, zirconia sand, alumina and shale ash. Usually the palpable particulate solid material has a particle size or average diameters of at least about 0.0006, preferably from about 0.03 to about 1 inch. The more preferred palpable particulate solid material employed is formed of Alundum or fused alumina and has a size range of from about 0.25 to about 0.75 inch.

A dehydrogenated effluent is recovered from the dehydrogenation zone 6 via conduit 8. The dehydrogenated effluent comprises:

(a) dehydrogenated product;
(b) unconverted hydrocarbons, i.e., hydrocarbons which were not dehydrogenated to the desired dehydrogenated hydrocarbon product during passage through the dehydrogenation zone;
(c) water;
(d) hydrogen iodide; and
(e) iodine.

The dehydrogenated effluent is introduced into a first quenching zone 10, wherein the effluent is contacted with an aqueous solution of hydrogen iodide introduced via a conduit 12.

The aqueous hydrogen iodide is generally introduced at a temperature in the range of about 74 to 88° C. It has been found that substantially larger amounts of tars and polymers are formed and deposited on the walls of the process equipment if the aqueous hydrogen iodide is introduced at temperatures below the above range. Furthermore, since the first quenching zone is preferably operated at substantially atmospheric pressure, the upper temperature for introducing aqueous hydrogen iodide is 100° C.

Preferably, the dehydrogenated effluent is quenched with an aqueous solution of hydrogen iodide having sufficient capacity to dissolve substantially all of the iodine and hydrogen iodide contained in the dehydrogenated effluent. Suitable solutions contain between 0 and 55 percent by weight hydrogen iodide or more. Such solutions may also contain a substantial amount of iodine without affecting their capacity for hydrogen iodide and iodine removal.

The resulting effluent from the first quenching zone 10, which comprises the dehydrogenated effluent and the aqueous hydrogen iodide quench, is introduced into a second quenching zone 14 via a conduit 16. The resulting effluent is quenched in the zone 14 with kerosene introduced via a conduit 18.

As previously mentioned, the kerosense quench markedly improves the operability of the overall system by substantially prohibiting the deposition of tars and polymers on the walls of the lines and vessels downstream of the dehydrogenation zone 6. In addition, the kerosene impedes the formation of additional tars and polymers. Thus, it is essential to the operation of this invention that the kerosene be contacted with the dehydrogenated effluent as quickly as possible after the aqueous hydrogen iodide quench.

More specifically, the resulting effluent from the first quenching zone must be contacted with kerosense within 1.0 second of contacting the dehydrogenated effluent with the aqueous hydrogen iodide quench. Preferably, the kerosene quench should occur within 0.1 second, and still more preferably with 0.01 second or less.

The kerosene should be introduced into the quenching zone 14 at a temperature normally attainable with cooling water or air in conventional heat exchange equipment.

The residence time of the materials in the second quenching zone 14 is in the range of about 0.01 to 10.0 seconds, and preferably less than 0.2 second.

Then resulting effluent from the second quenching zone 14 is withdrawn via a conduit 20 and introduced into a separation zone, for example, a cyclone separation zone 22. The resulting effluent is separated into a liquid and vapor phase in the separation zone 22. A hydrocarbon vapor phase is withdrawn from the cyclone via a conduit 24. The hydrocarbon vapor phase contains the dehydrogenated hydrocarbon product, unconverted hydrocarbons and some entrained kerosene and water. The vapor phase is subsequently introduced into a third quenching zone 26, as hereinafter discussed.

Returning to the cyclone, a liquid phase, containing aqueous hydrogen iodide, kerosene, tars and polymers and some entrained hydrocarbon gases, is withdrawn via a conduit 28. The aqueous hydrogen iodide contains substantially all of the hydrogen iodide and iodine that was originally contained in the dehydrogenated effluent.

The liquid phase is introduced into a conventional type liquid-vapor separation zone 30, wherein the entrained hydrocarbon gases are recovered via a conduit 32 and conducted with the hydrocarbon phase in conduit 24 to the third quenching zone 26. The resulting liquid phase obtained in the vapor-liquid separator 30 is withdrawn via a conduit 34 and introduced into a settling zone 36. In the settling zone 36, the liquid phase separates into a kerosene phase, an emulsion phase, and an aqueous hydrogen iodide phase, with the kerosene phase on top, the emulsion phase in the middle, and the aqueous phase on the bottom, as illustrated in the drawing. The emulsion phase contains substantially all of the tars and polymers.

The separation takes place quite rapidly and a distinct interface is normally always evident between the phases. This enables the phases to be easily separated as hereinafter discussed.

The kerosene phase is withdrawn from the top of the settling zone 36 via a conduit 38 and introduced into a filtration zone 40. A minor amount of coke particles are frequently formed during the dehydrogenation reaction and these particles tend to remain dispersed in each of the liquid phases. Hence, the kerosene is preferably filtered to remove these particles prior to being reused in the quenching zone. The filtered kerosene is preferably introduced via a conduit 42 into a cooling zone 44, prior to being reintroduced via the conduit 18 into the second quenching zone 14. Fresh make-up kerosene is added to the system via a conduit 46.

The aqueous hydrogen iodide phase is withdrawn from the bottom of the settling zone 36 via a conduit 48, filtered in a filtration zone 50 in order to remove any solid particles, and thereafter introduced via a conduit 52 into a cooling zone 54. As previously mentioned, the aqueous phase is preferably cooled to a temperature in the range of about 74 to 88° C. prior to reintroducing the aqueous phase into the first quenching zone 10 via the conduit 12.

In order to recover, for reuse in the dehydrogenation zone, the iodine and hydrogen iodide absorbed into the aqueous phase in the first quenching zone, a portion of the filtered aqueous hydrogen iodide phase is withdrawn via a conduit 56 and subsequently introduced into any conventional type iodine recovery system not shown on the drawing. The recovered iodine and hydrogen iodide may be reintroduced into the dehydrogenation zone 6.

The volume of the emulsion phase is preferably allowed to continue to build up in the settling zone 36, with continuous removal of the kerosene and aqueous phases occurring. When the emulsion phase occupies substantially all of the volume of the settling zone 36, the liquid phase from the vapor-liquid separator 30 is then preferably introduced into a second settling zone, not shown on the drawing.

The use of the two settling zones enables continuous operation of the overall system. However, any conventional type continuous, batch or stage-wise operation may be employed instead of the use of the two settling zones.

The emulsion phase is preferably introduced into a filtration zone, for example, the filtration zone 50, to yield a residue and a filtrate. The residue comprises a mixture of substantially all of the tars and polymers present in the system and some solid coke particles. The residue is subsequently discarded.

The filtrate, which is easily separated from the residue, readily separates into an aqueous hydrogen iodide layer and a kerosene layer, which are in turn easily separable. The aqueous hydrogen iodide and kerosene may be separated and then returned for reuse in the respective quenching zones.

The average composition of the emulsion phase is approximately 80–90 weight percent aqueous hydrogen iodide, 5–10 weight percent kerosene, and 5–10 weight percent residue.

As can be seen from the above, the residue which heretofore would have deposited on the walls of the lines and vessels is easily removed from the system.

Returning to the hydrocarbon vapor phase, the vapor phase is introduced into a third quenching zone 26 wherein the vapor phase is contacted with water introduced via a conduit 58. The water quench, which is introduced as a liquid, removes substantially all of the water and kerosene that is entrained in the hydrocarbon vapor phase. The mixture of fluids is then withdrawn from the quenching zone 26 via a conduit 60 and introduced into any conventional type separation zone 62. The fluids separate in the separation zone 62 into three layers, a top hydrocarbon gas phase layer, a middle kerosene layer, and a bottom water layer.

The hydrocarbon gas phase, which is substantially free of water and kerosene, is withdrawn from the zone 62 via a conduit 64. The gas phase is subsequently treated in any conventional type purification zone such as distillation, solvent extraction or the like to recover the desired dehydrogenated product.

Kerosene is withdrawn from the zone 62 via a conduit 66 and preferably returned to the second quenching zone 14 for reuse.

Water is withdrawn from the zone 62 via a conduit 68. The water is preferably cooled in a cooling zone 70 prior to being reused in the third quenching zone. Excess water is withdrawn from the system via a conduit 72.

According to the provisions of the patent statutes, I have explained the principles, preferred construction, and mode of operation of my invention and have illustrated and described what I now consider to represent its best embodiment. However, I desire to have it understood that, within the scope of the appended claims, the invention may be practiced otherwise than as specifically illustrated and disclosed.

What is claimed is:

1. An improved process for quenching the dehydrogenation effluent obtained from an iodine-effected dehydrogenation zone, which process comprises:
   (a) contacting a hydrocarbon with iodine in a dehydrogenation zone maintained under dehydrogenation conditions to yield a dehydrogenation effluent,
   (b) contacting said dehydrogenation effluent with an aqueous solution of hydrogen iodide in a first quenching zone,
   (c) introducing the resulting effluent from the first quenching zone into a second quenching zone wherein said resulting effluent is contacted with kerosene within 1.0 second of contacting said dehydrogenated effluent with said aqueous hydrogen iodide, and
   (d) thereafter introducing the resulting effluent from the second quenching zone into a separation zone to yield a dehydrogenated hydrocarbon phase, which is subsequently purified to yield the desired dehydrogenated product.

2. The process of claim 1 wherein the resulting effluent from the first quenching zone is contacted with kerosene with 0.1 second of contacting said dehydrogenated effluent with aqueous hydrogen iodide.

3. The process of claim 1 wherein the resulting effluent from the first quenching zone is contacted with kerosene within 0.1 second of contacting said dehydrogenated effluent with aqueous hydrogen iodide.

4. An improved process for quenching the dehydrogenated effluent obtained from an iodine-effected dehydrogenation zone, wherein the dehydrogenated hydrocarbons contained in said effluent are substantially prohibited from polymerizing to form polymers and tars and wherein the tars and polymers that do form are substantially prohibited from depositing out on the walls of the lines and vessels downstream of the dehydrogenation zone, thereby improving operability in the remaining process steps downstream of the dehydrogenation zone, which process comprises:
   (a) contacting a hydrocarbon with iodine in a dehydrogenation zone maintained under dehydrogenation conditions to yield a dehydrogenation effluent,
   (b) quenching said dehydrogenation effluent with an aqueous solution of hydrogen iodide in a first quenching zone in order to remove at least a portion of the iodine and hydrogen iodide from said dehydrogenated effluent,
   (c) quenching the resulting effluent from the first quenching zone with kerosene in a second quenching zone in order to reduce polymerization of the hydrocarbons contained in said effluent and to substantially prohibit deposition of tars and polymers, said kerosene quench occurring within 1.0 second of contacting said dehydrogenated effluent with said aqueous hydrogen iodide quench,
   (d) introducing the resulting effluent from the second quenching zone into a cyclone separator to separate said effluent into a vaporous hydrocarbon phase and a liquid phase,
   (e) separately withdrawing said vaporous hydrocarbon phase, which is substantially free of iodine and hydrogen iodide, and said liquid phase from said cyclone separator,
   (f) introducing said liquid phase into a settling zone wherein said liquid phase separates into a top kerosene phase, a middle emulsion phase, and a bottom aqueous hydrogen iodide phase,
   (g) separately withdrawing each of the three phases from the settling zone,
   (h) subsequently treating the kerosene phase and the aqueous hydrogen iodide phase to recover kerosene and aqueous hydrogen iodide therefrom, at least a portion of which is recycled to the second and first quenching zones, respectively, and
   (i) thereafter quenching said vaporous hydrocarbon phase of step (e) with water in a third quenching zone in order to yield a dehydrogenated product substantially free of hydrogen iodide, iodine, water and kerosene.

5. The process of claim 4 wherein the hyrocarbon is contacted with iodine, oxygen and water in said dehydrogenation zone.

6. The process of claim 4 wherein the dehydrogenation zone contains a bed of palpable particulate solid material and is maintained at a temperature in the range of from 450 to 800° C.

7. The process of claim 4 wherein said aqueous solution of hydrogen iodide is at a temperature in the range of about 74 to 88° C. when it is initially contacted with said dehydrogenated effluent in said first quenching zone.

8. The process of claim 4 wherein substantially all of the hydrogen iodide and iodine is removed from said dehydrogenated effluent in said first quenching zone.

9. The process of claim 4 wherein the resulting effluent from the first quenching zone is contacted in said second quenching zone with kerosene within 0.1 second of contacting said dehydrogenated effluent with aqueous hydrogen iodide.

10. The process of claim 4 wherein the resulting effluent from the first quenching zone is contacted in said second quenching zone with kerosene within 0.01 second of contacting said dehydrogenated effluent with aqueous hydrogen iodide.

11. The process of claim 4 wherein the kerosene phase is withdrawn from the top of the settling zone and is filtered prior to reintroducing the kerosene into the second quenching zone.

References Cited
UNITED STATES PATENTS

| | | | |
|---|---|---|---|
| 3,200,166 | 8/1965 | Bojanowski | 260—680 |
| 3,274,284 | 9/1966 | Karkalits et al. | 260—680 |
| 3,281,489 | 10/1966 | Goering | 260—681.5 |
| 3,293,316 | 12/1966 | Clay | 260—681.5 |

DELBERT E. GANTZ, *Primary Examiner.*

G. E. SCHMITKONS, *Assistant Examiner.*